United States Patent [19]
Miller et al.

[11] Patent Number: 5,422,950
[45] Date of Patent: Jun. 6, 1995

[54] REMOTE TERMINAL CHANNEL UNIT FOR TELEPHONE TRANSMISSION LINES

[75] Inventors: Bruce R. Miller; Frank X. Garcia, both of Aurora, Ill.

[73] Assignee: Teltrend Inc., St. Charles, Ill.

[21] Appl. No.: 282,426

[22] Filed: Jul. 28, 1994

Related U.S. Application Data

[63] Continuation of Ser. No. 56,671, May 3, 1993, abandoned.

[51] Int. Cl.$^6$ .......................................... H04M 7/04
[52] U.S. Cl. ................................... 379/399; 379/398; 379/377; 379/391; 379/390; 379/340
[58] Field of Search ............... 379/399, 398, 377, 391, 379/390, 340

[56] References Cited

U.S. PATENT DOCUMENTS

| | | | |
|---|---|---|---|
| 3,936,602 | 2/1976 | Korver | 370/27 |
| 4,192,007 | 3/1980 | Becker | 379/418 |
| 4,315,107 | 2/1982 | Ciesielka | 379/400 |
| 4,331,843 | 5/1982 | Tarr et al. | 379/403 |
| 4,377,730 | 3/1983 | Gay et al. | 379/402 |
| 4,489,222 | 12/1984 | Lusignan et al. | 379/402 |
| 4,787,080 | 11/1988 | Yamakido et al. | 379/410 |
| 5,034,978 | 7/1991 | Nguyen et al. | 379/402 |
| 5,133,006 | 7/1992 | Khuat | 379/399 |
| 5,151,936 | 9/1992 | Riedle | 379/403 |
| 5,172,411 | 12/1992 | Gazsi | 379/402 |
| 5,175,763 | 12/1992 | Gazsi | 379/402 |
| 5,175,764 | 12/1992 | Patel et al. | 379/412 |
| 5,253,291 | 10/1993 | Naseer et al. | 379/406 |

FOREIGN PATENT DOCUMENTS 0503528 9/1992 European Pat. Off. ............ 379/399

OTHER PUBLICATIONS

Brochure excerpt, 8-Bit Embedded Controller Handbook, Intel Corporation, 1991.
Brochure excerpt, Data Book—Microcontroller, Fifth Edition, OKI Semiconductor, Jun. 1990.
Brochure excerpt, Integrated Circuits Data Handbook—80C51-Based 8-Bit Microcontrollers, Signetics Company—Philips Semiconductors, Feb. 1992.
Brochure excerpt, Telecommunications Databook, National Semiconductor Corporation, 1992 Edition.

*Primary Examiner*—James L. Dwyer
*Assistant Examiner*—Jacques M. Saint-Surin
*Attorney, Agent, or Firm*—Allegretti & Witcoff, Ltd.

[57] ABSTRACT

An automatic loss compensation for use in a two to four wire hybrid converter in a telephone system. Many hybrid converters provide a substantially fixed gain for receive signals that are provided to the customer loop telephone line and for transmit signals that are provided to the digital carrier transmission line. The compensation circuit includes a measurement circuit, controller, and receive and transmit amplifier. The measurement circuit determines the length of the customer loop telephone line and provides a length signal. The controller receives the length signal and categorizes the length as being within one of a plurality of segments. The controller appropriately varies the amplification and phase of the receive signal, which is then combined with an inverted transmit signal, in order to substantially reduce reflected signals from the transmission line and transmission line termination.

1 Claim, 2 Drawing Sheets

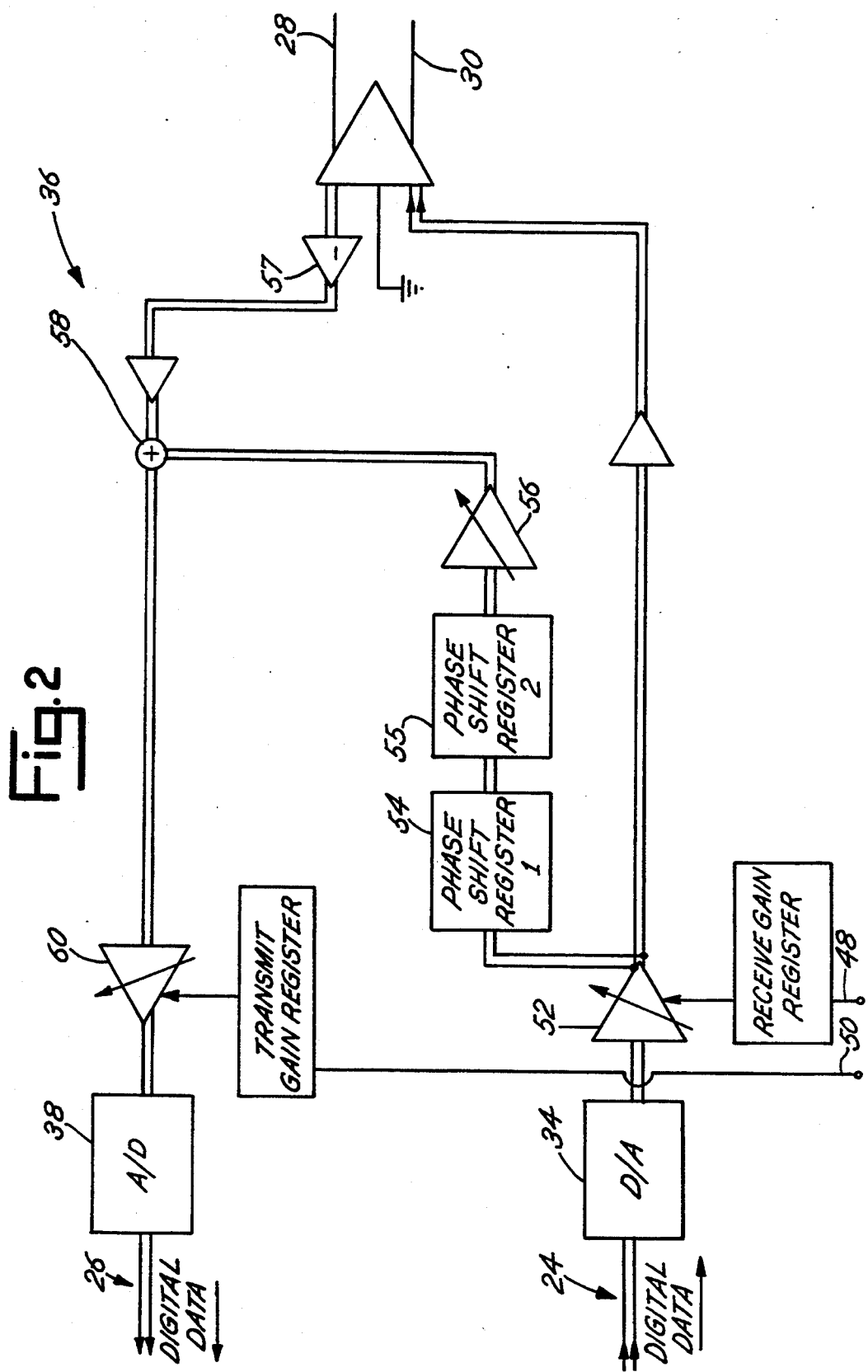

REMOTE TERMINAL CHANNEL UNIT FOR TELEPHONE TRANSMISSION LINES

This is a continuation application Ser. No. 08/056,671, filed May 3, 1993, now abandoned.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION present invention relates generally to conditioning elements for telecommunications transmission lines and, more particularly, to remote channel unit having a trans-hybrid loss compensation circuit used with digital communication transmission facilities. Such facilities include a central office which may transmit data signals over transmission lines to remote terminals and customer premises. The signals may be sent over two pairs of transmission lines in a digital format or differentially on two conductors, known as the Tip-Ring Pair.

The Bell telephone system in the United States, for example, has a widely utilized Digital "D" multiplexing pulse code modulation systems. A "D" channel bank, for example, commonly provides multiple DS-1 signals that are carried on a T-1 transmission system. One pair of cables is provided for each direction of transmission.

Signals which are sent via digital carrier transmission lines from the central office reach a remote terminal before reaching the customer premises. The remote terminal then converts the digital signals to an analog signal which may then be an intelligible signal for the telephone.

Thus, in the remote terminal, the digital data signals, sent over the T-1 lines, are converted to analog telephone signals and then supplied to a customer loop telephone line. The analog telephone signals may then be received by the customer premises, which may include telephones and, in some cases, PBX units. Conversely, the remote terminals receive analog telephone signals from the telephones and PBX units and convert them to digital data signals, which then can be transmitted over the T-1 transmission system.

The length of the telephone line between the remote terminal and the PBX or telephone in the customer premises may vary substantially. The length of the line affects the impedance of the line and, thus, for example, the amplitude of signals between the remote terminal and the telephone.

Many transmission lines include a hybrid circuit that interfaces a two-wire transmit transmission line and a two-wire receive transmission line (a four-wire circuit) to the Tip-Ring pair. Part of the signal on the receive transmission line may be reflected back to the transmit transmission line. Thus, a common practice is to invert the received signal and add it to any transmit signal received from the telephone lines (to effectively cancel out "reflected" signals). The level of the transmitted signal is compared to the receive signal and represented in dB: $dB = 20 \text{ Log Transmit Voltage/Receive Voltage}$.

In presently available equipment, such a trans-hybrid converter may work well if the telephone line is relatively short. However, if the telephone line is fairly long, the reflected signal may exhibit a phase shift and have decreased in amplitude substantially. As a result, the inverted signal may be larger (or smaller) than the reflected signal and it may be more or less than 180° out of phase with the reflected signal. Consequently, reflected signals, or noise, will be introduced into the transmission line system.

SUMMARY OF THE INVENTION

In a principal aspect, the present invention relates to a trans-hybrid converter and to a trans-hybrid loss compensation circuit in such a converter. The circuit includes a measurement circuit, a controller, an inverter, and a summing circuit. The converter accepts a receive signal from the digital receive carrier transmission line and transmits an analog telephone receive signal to the customer loop telephone line. The inverter accepts the receive signal and inverts it, providing an inverted signal. The summing circuit takes the receive signal, adjusts it, and combines the adjusted receive signal with the inverted signal to make a hybrid signal.

The measurement circuit effectively measures the resistance of the customer loop telephone line between the telephone and the compensation circuit to determine the length of the telephone line. The controller categorizes the length or resistance of the telephone line as in one of a plurality of categories and responsively provides a control signal. The summing circuit adjusts the phase and amplitude of the receive signal in accordance with the control signal.

Thus, an object of the present invention is an improved trans-hybrid loss compensation circuit that may be used with digital telecommunication facilities. Yet a further object is a compensation circuit that is more reliable and less expensive to manufacture to use. Still a further object compensation circuit that provides more automatic trans-hybrid compensation. These and other objects, features, and advantages of the present invention are discussed or are apparent in the following detailed description.

BRIEF DESCRIPTION OF THE DRAWINGS

A preferred embodiment of the present invention is described herein with reference to the drawings wherein:

FIG. 2 is a more detailed block diagram of the compensation circuit employed by the preferred embodiment shown in FIG. 1.

DETAILED DESCRIPTION OF THE PREFERRED EMBODIMENT

Figure 1:
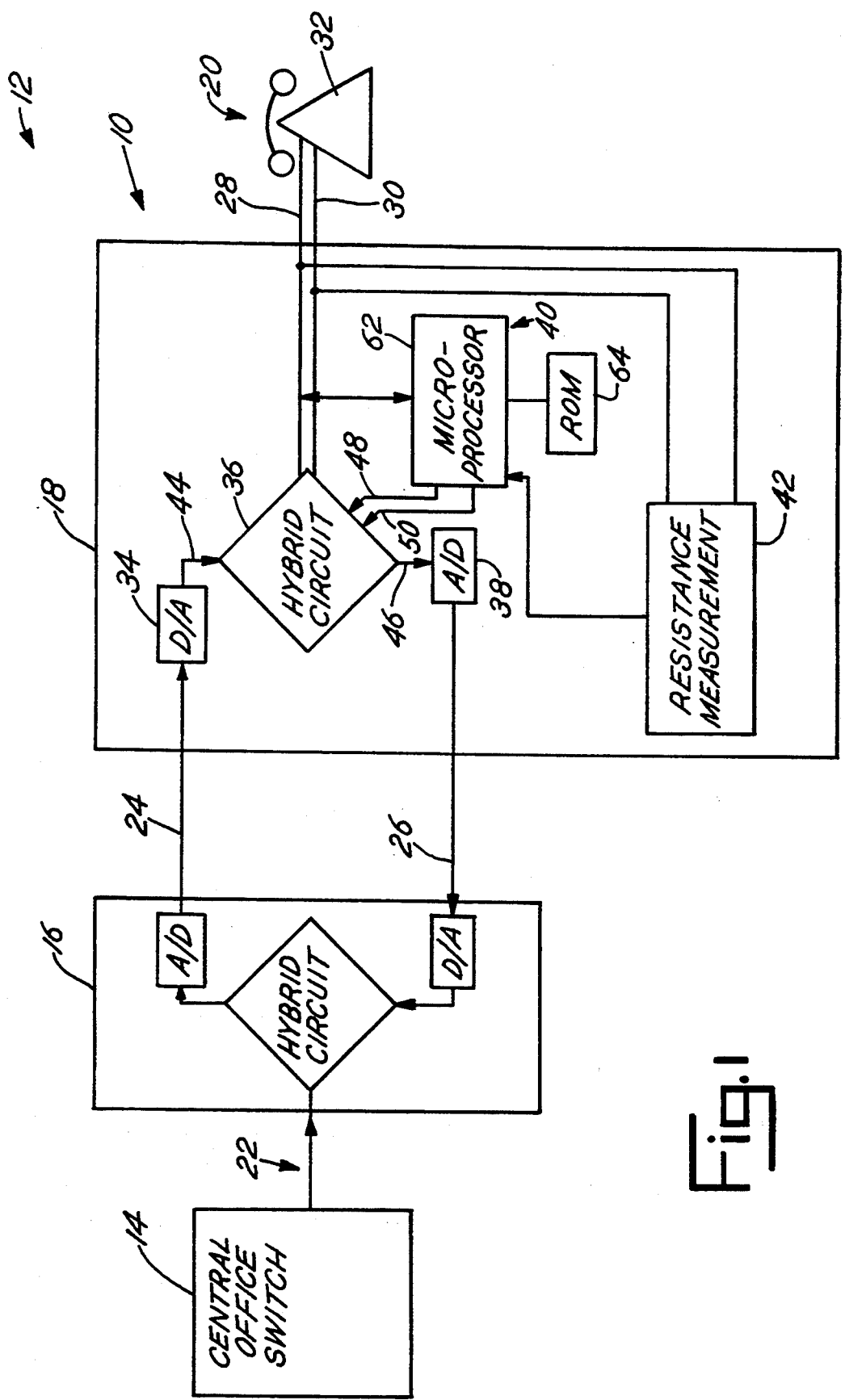
FIG. 1 is a block diagram showing a preferred embodiment of the present invention.

Referring to FIGS. 1–2, the preferred embodiment of the present invention is shown as a compensation circuit 10 for use with digital transmission line system 12. As shown in FIG. 1, the digital transmission line system 12 includes a central office switch 14, central office channel unit 16, remote terminal channel unit 18, and customer premises 20. The central office switch 14 and channel unit 16 are interconnected with a two-wire, analog span 22. The central office channel unit 16 is interconnected to the remote channel unit 18 via a pair of receive transmission lines 24 and a pair of transmit transmission lines 26. The remote terminal channel unit 18 and customer premises 20 are interconnected with a two-wire analog line, or Tip-Ring Pair, 28, 30. The customer premises includes a telephone 32 and may include other equipment, such as a PBX unit (not shown).

The remote terminal channel unit 18 includes a digital to analog converter 34, a four-wire to two-wire hybrid circuit 36, an analog to digital converter 38, a controller 40, and a resistance measurement circuit 42. A receive cable pair 44 interconnects the digital to analog converter 32 to the hybrid circuit 36, and a transmit cable pair 46 interconnects the hybrid circuit 36 to the analog to digital converter 42. The controller 40 provides signals to the hybrid circuit 36 via a receive gain lead 48 and a transmit gain lead 50.

In operation, the central office switch 14 transmits an analog signal to the office channel unit 16. The channel unit 16 then converts the analog signal from the central office 14 to a digital signal. It communicates with the remote channel unit 18 via the pair of transmit transmission lines 26 and the pair of receive ransmission lines 24.

The digital to analog converter 34 converts the digital data signal received over the receive transmission lines 24 to an analog signal. The hybrid circuit 36 transmits the signal to the telephone lines 28, 30. Further, transmit signals from the telephone lines 28, 30 are transmitted to the analog to digital converter 38 and, thereafter, transmitted to the transmit transmission line 26.

The resistance measurement circuit 42 may include, for example, a simple resistance measurement circuit which measures the voltage for a particular current on the telephone lines 28, 30 and, therefore, the effective length of the span between the remote terminal unit 18 and the telephone 32. The resistance measurement circuit 42 may then provide a representation of the resistance to the controller 40. Alternatively, the resistance, or length, measurement may be made using, for example, the invention entitled Gain and Loss Compensator for Telephone Lines, described in a patent application filed on May 3, 1993 (Ser. No. 08/056,412), now abandoned for an invention by Messrs. Frank Garcia and Bruce Miller.

As shown in FIG. 2, the hybrid circuit 36 includes a variable gain, programmable receive amplifier 52, first and second phase shift registers 54, 55, programmable attenuator register 56, an inverter 57, a summing circuit or adder 58, and a variable gain, programmable transmit amplifier 60.

The inverter 57 inverts analog telephone signals to be sent out over the system 12. The inverted output from the telephone lines 28 30 and the non-inverted output of the amplifiers 56 are then combined by the summing circuit or adder 58, and sent to the variable gain programmable transmit amplifier 60.

The control signal provided via the leads 48, 50 controls the amplifiers. The resistance, and, thus, corresponding length, is categorized by controller 40. The controller 40 includes a microprocessor 62 and Read Only Memory 64. The microprocessor 62 in the preferred embodiment is a 8751BH, manufactured by, for example, Intel, OKI, or Segnetics. Upon receiving a measurement signal, the microprocessor 62 compares the value receive with values in the read only memory 64 and determined what category the length, or resistance, the cables 28, 30 are within. In the preferred embodiment, four categories are used, such that the microprocessor 62 determines in which of four categories the length falls and, thus, which of four factors the amplifiers 52, 60 should be programmed with.

The microprocessor 62 reads the transmission line length for the automatic loss compensator 10. The microprocessor 62 then finds the optimum gain code word in a look up table in the ROM 64, and programs the amplifiers 52, 56 with that code word. This is generally done only once when the telephone 32 goes off hook. However, it could be updated in an ongoing basis, as long as the telephone 32 is off hook. This would "fine tune" the compensator 10 for any additional telephones that go off hook during the course of the telephone call.

A listing of the steps followed by the microprocessor for Trans-Hybrid Loss Automatic adjustment follows.

1. Obtain from the Auto Loss Compensation Circuit the length of the telephone transmission line to the customer premises.
2. If the cable is less then 3K feet go to quadrant 1 Register.
3. If the cable is greater than 3K feet but less then 5K feet go to quadrant 2 Register
4. If the cable is greater than 5K feet but less then 8K feet go to quadrant 3 Register.
5. If the cable is greater than 8K feet but less then 12K feet go to quadrant 4 Register.

Quadrant 1 holds Trans-Hybrid Loss coefficients for a substantiously optimal gain for a transmission line 2K feet long.

Quadrant 2 holds Trans-Hybrid Loss coefficients for a substantiously optimal gain for a Transmission line 5K feet long.

Quadrant 3 holds Trans-Hybrid Loss coefficients for a substantiously optimal gain for a transmission line 8K feet long.

Quadrant 4 holds Trans-Hybrid Loss coefficients for a substantiously optimal gain for a transmission line 11K feet long.

A preferred embodiment of the present inventions has been described herein. It is to be understood, of course, that changes and modifications may be made in the preferred embodiment without departing from the true scope and spirit of the present invention, as defined by the appended claims.

We claim:

1. A remote terminal channel unit for interfacing between digital carrier transmission lines and an analog customer loop telephone line and for reducing reflected signals from said customer loop telephone line, said channel unit being interconnected to receive and transmit carrier transmission lines and to said customer loop telephone line, said receive carrier transmission line carrying a digital receive signal, said telephone line being interconnected to a telephone and defining a length between said channel unit and said telephone, said telephone producing an analog transmit signal on said customer loop telephone line, comprising, in combination:

a digital to analog converter for receiving said digital receive signal from said receive carrier transmission line and converting said digital receive signal to an analog receive signal, said analog receive signal and analog transmit signal exhibiting a phase and amplitude relationship;

a measurement circuit for determining said length of said customer loop telephone line and providing a length signal;

control means for receiving said length signal and categorizing said length as within one of a plurality of segments, said control means providing a measurement signal indicative of which segment said length is within;

an inverter for inverting said analog receive signal with respect to said analog transmit signal;

an analog summing circuit, interconnected to said inverter, for combining said analog transmit signal and analog receive signal, said summing circuit including a compensator for receiving said measurement signal and responsively adjusting said phase and amplitude relationship of said analog receive signal with respect to said analog transmit signal, said summing circuit to substantially reducing said reflected signals and providing a combined analog signal;

a hybrid converter for transferring said analog receive signal to said customer loop telephone line and for transferring said analog receive transmit signal to said analog summing circuit; and an analog to digital converter for receiving said combined analog signal from said summing circuit, converting said combined signal to a digital transmit signal, and transmitting said digital transmit signal to said transmit carrier transmission line.

* * * * *